United States Patent [19]

Baker et al.

[11] Patent Number: 4,932,132
[45] Date of Patent: Jun. 12, 1990

[54] ELECTRONIC LEVEL APPARATUS AND METHOD

[75] Inventors: Charles D. Baker, Sandy; Owen D. Brimhall, West Valley City; James E. Messinger, Salt Lake City, all of Utah

[73] Assignee: Technical Research Associates, Inc., Salt Lake City, Utah

[21] Appl. No.: 317,444

[22] Filed: Mar. 1, 1989

[51] Int. Cl.$^5$ .............................................. G01C 9/06
[52] U.S. Cl. ........................................ 33/366; 33/384
[58] Field of Search ................. 33/366, 384, 388, 385, 33/386, 387; 340/689

[56] References Cited

U.S. PATENT DOCUMENTS

| | | | |
|---|---|---|---|
| 3,184,861 | 5/1965 | Conrad | 33/366 |
| 3,584,387 | 6/1971 | Strum | 33/366 |
| 3,839,904 | 10/1974 | Stripling et al. | 33/336 |
| 3,984,918 | 10/1976 | Chaney | 33/366 |
| 4,003,134 | 1/1977 | Adams | 33/366 |
| 4,073,062 | 2/1978 | Wright | 33/388 |
| 4,182,046 | 1/1980 | Ludlow et al. | 33/366 |
| 4,590,680 | 5/1986 | Hanchett et al. | 33/366 |
| 4,590,682 | 5/1986 | Koch | 33/388 |
| 4,720,920 | 1/1988 | Tudek | 33/366 |

FOREIGN PATENT DOCUMENTS

| | | | |
|---|---|---|---|
| 6112919 | 5/1986 | Japan | 33/366 |
| 2177411 | 8/1987 | Japan | 33/366 |
| 157078 | 9/1932 | Switzerland | 33/385 |

Primary Examiner—Thomas B. Will
Attorney, Agent, or Firm—J. Winslow Young

[57] ABSTRACT

This invention relates to an electronic level apparatus wherein a hollow torus is rotatably mounted in the level. A body of ferromagnetic fluid creates a horizontal reference and is sensed to provide an audible signal when a predetermined angular orientation is detected by the sensor.

2 Claims, 1 Drawing Sheet

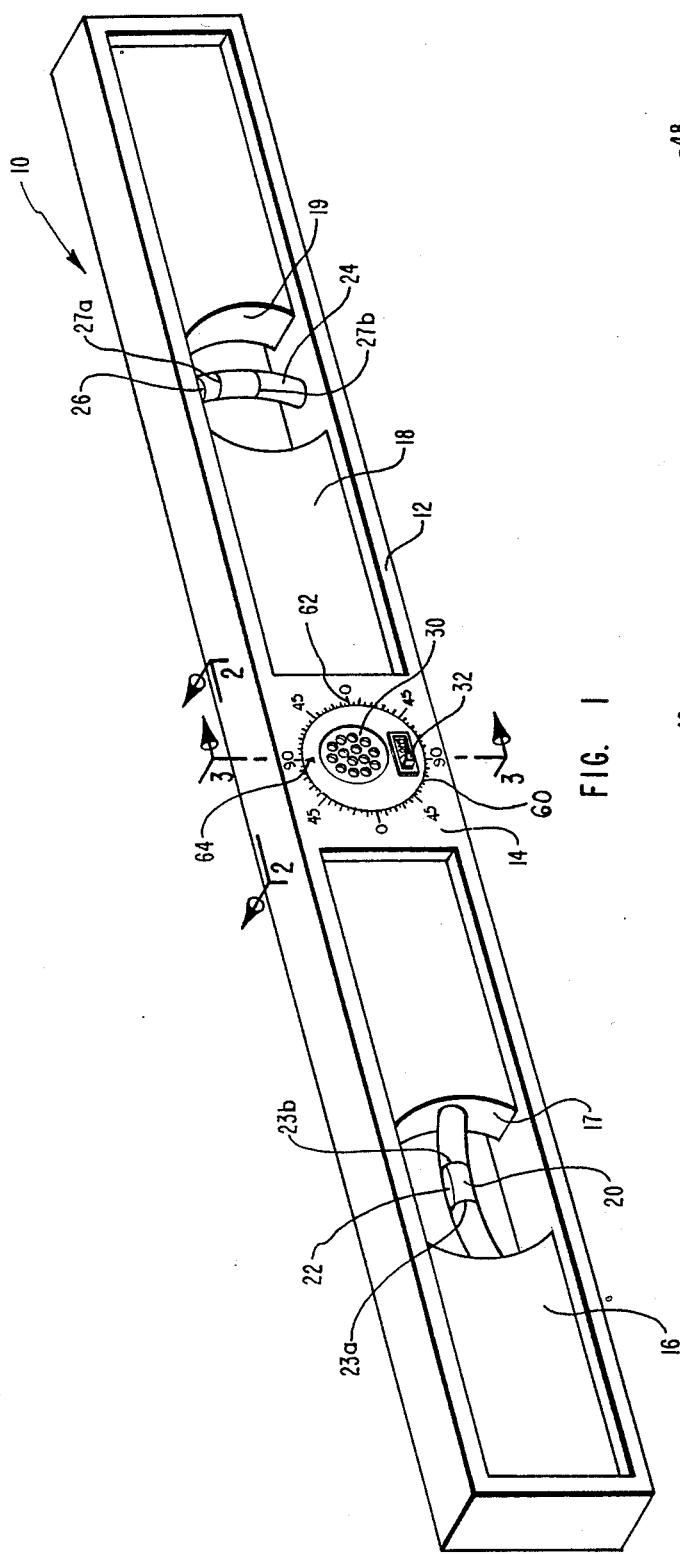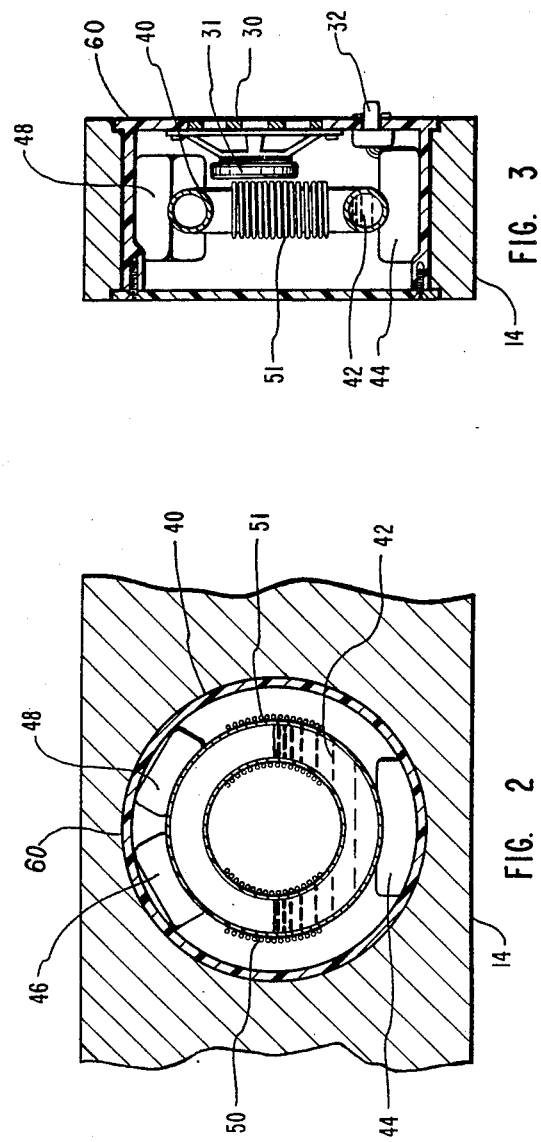

ELECTRONIC LEVEL APPARATUS AND METHOD

BACKGROUND

1. Field of the Invention

This invention relates to levels and, more particularly, to an electronic level apparatus and method whereby an audible tone is produced to indicate whenever the level is in a predetermined position.

2. The Prior Art

Various forms of levels have been used throughout history as devices to enable the operator to determine when a particular surface is horizontal. Early levels consisted of a body of liquid in an open vessel since liquid is known to form a flat, horizontal surface. The surface of the liquid formed a reference surface which served as the standard against which the horizontal character of a second surface was estimated. This basic principle has evolved into a bubble level wherein a bubble is trapped in a body of liquid, the liquid being enclosed in a upwardly curved, clear tube. The tube is oriented in the level apparatus so that the curvilinear orientation of the tube is in the vertical plane to thereby place the bubble in the center of the tube when the level corresponds with the horizontal. Centering marks are generally included on each side of the leveled bubble to more accurately indicate when the horizontal position has been achieved with the level. An accurate vertical positioning of an object perpendicular to the horizontal can be achieved by placing a second tube in the level so that the bubble in the second tube is centered when the level is perpendicular to the horizontal.

Clearly, this type of leveling device depends entirely upon the user being able to visually observe the respective bubble in order to accurately determine either the horizontal or vertical position of the level. However, there are many circumstances where it is impossible to visually observe the correct bubble position either by reason of its physical location or the lack of sufficient light. Other applications lend themselves to sensing the orientation of an object electronically. Several patents disclose various methods of accomplishing this result.

Conrad (U.S. Pat. No. 3,184,861) discloses a position deviation sensing device utilizing skin effect on a liquid electrolyte encapsulated within a nonmagnetic material.

Scopacasa (U.S. Pat. No. 3,786,472) discloses an electric level which uses movement of an electrically conductive liquid contained in a suitably sealed chamber. Electrodes are embedded in the chamber and correspond to points of contact of the liquid when the chamber is inclined to predetermined angles.

Chaney (U.S. Pat. No. 3,984,918) discloses an inclinometer that uses a ferrofluid enclosed within a torroidal chamber. The ferrofluid is carried in a closed planar loop which is symmetrical about at least one axis. Inclination of the loop in the plane in which it lies causes relative displacement of the liquid and the loop. The displacement of the ferrofluid in the loop is sensed electronically.

Cantarella, et al. (U.S. Pat. No. 4,167,818) discloses an electronic inclination gauge wherein a digital readout is provided by a gravity-sensitive potentiometer. The potentiometer is in the form of a sealed, circular cell partially filled with a semiconductive liquid such as alcohol. Electrodes are emerged in the alcohol and serve as the sensors for sensing the position of the alcohol in the cell.

Kent, et al. (U.S. Pat. No. 4,672,753) discloses a rotation sensor wherein a torroidal chamber having a square or rectangular cross-section contains a small body of dielectric or resistive fluid which has a total volume less than a 30° sector of the channel. A discontinuous resistive strip circles the interior surface of the channel outer wall and a continuous conductive strip circles the exterior surface of the channel inner wall.

Clearly, numerous devices are available to allow the operator to either visually or audibly check the orientation of a particular surface. Therefore, what is needed is a level apparatus that can be selectively preset to a specific angle of inclination ranging between the horizontal and the vertical and having an audible signal means to audibly signal when the level is oriented at the specifically selected angle. Such a novel apparatus and method is disclosed and claimed herein.

BRIEF SUMMARY AND OBJECTS OF THE INVENTION

This invention relates to a novel electronic level apparatus and method whereby an audible signal is provided when the level is oriented in a predetermined position relative to the horizontal position. A hollow torus is mounted coplanar to the plane of the level and is partially filled with ferromagnetic fluid. Sensing coils are positioned around the torus to sense the position of the ferromagnetic fluid in the torus as a function of the position of the level. The housing for the hollow torus is rotatable about the axis of the hollow torus so as to selectively position the sensing mechanism of the hollow torus at any predetermined angle relative to the body of the level. An audible signal is supplied by the sensing mechanism to indicate when the level is correctly positioned.

It is, therefore, a primary object of this invention to provide improvements in position sensing apparatus.

Another object of this invention is to provide improvements in the method of determining the angular orientation of a surface relative to the horizontal.

Another object of this invention is to provide an audible signal to audibly indicate a predetermined angular orientation of the level apparatus relative to the horizontal.

Another object of this invention is to provide an electronic sensing mechanism for determining the angular orientation of a level, the electronic mechanism including a rotatable, hollow torus partially filled with a ferromagnetic fluid and including a pair of sensing coils positioned on opposite sides of the hollow torus.

These and other objects and features of the present invention will become more readily apparent from the following description in which preferred and other embodiments of the invention have been set forth in conjunction with the accompanying drawing and appended claims.

BRIEF DESCRIPTION OF THE DRAWING

FIG. 1 is a perspective view of a presently preferred embodiment of this invention incorporated into a standard level;

FIG. 2 is an enlarged, partial, cross-sectional view taken along lines 2—2 of FIG. 1; and FIG. 3 is an enlarged, partial cross-sectional view taken along lines 3—3 of FIG. 1.

DETAILED DESCRIPTION OF THE PREFERRED EMBODIMENTS

The invention is best understood by reference to the drawing wherein like parts are designated by like numerals throughout in conjunction with the following description.

General Discussion

Referring now more particularly to FIG. 1, the novel, electronic level apparatus of this invention is shown generally at 10 and includes a level body 12, with a centrally disposed chamber 14 which receives a sensor housing 60. Level body 12 is configured as a standard level body having a parallel upper and lower surfaces with interposing webs 16 and 18 on each side of chamber 14. A perforated speaker cover 30 is disposed on the face of sensor chamber 60 along with a switch 32.

A conventional horizontal level tube 20 is incorporated into a cutout section 17 of web 16 and is configured as an upwardly curvilinear, transparent, fluid-filled tube having a bubble 22 disposed therein. Centering marks 23a and 23b bracket bubble 22 to indicate when bubble 22 is properly centered to indicate that level 10 is horizontal. A second, vertical level tube 24 is disposed in a cutout section 19 of web 18 and is configured to visually indicate when level 10 is oriented perpendicular to the horizontal. In particular, a bubble 26 will be bracketed by centering marks 27a and 27b when level 10 is perpendicular to the horizontal.

Referring now also to FIGS. 2 and 3, chamber 14 is configured as a cylindrical chamber into which sensor housing 60 is rotatably mounted in frictional engagement. Importantly, a hollow torus 40 is mounted coaxially with sensor housing 60 so that when sensor housing 60 is rotated hollow torus 40 is also rotated. The degree of rotation of sensor housing 60 relative to level body 12 is indicated by a plurality of peripherally oriented indicia 62 in combination with indicia 64 on the face of sensor housing 60. Hollow torus 40 is also oriented coplanar with the plane of level 10 and includes a body of ferromagnetic fluid 42. A pair of sensing coils, coils 50 and 51, are wrapped around preselected portions on opposite sides of hollow torus 40. Coils 50 and 51 are symbolic and provide the sensing mechanism for sensing the position of ferromagnetic fluid 42 relative to the body of electronic level 10.

An electronic sensing circuit 46 is electronically coupled to sensing coils 50 and 51 so as to determine the relationship of ferromagnetic fluid 42 relative to the respective sensing coils. A signal generator 48 provides an electrical signal to a speaker 31 (behind speaker covering 30) so as to provide the operator (not shown) with an audible signal when ferromagnetic fluid 42 is equidistantly disposed between coils 50 and coils 51. A suitable power supply, power supply 44, supplies the necessary electrical power for the electronic sensing circuit 46, signal generator 48, and speaker 31. Switch 32 activates the entire electronic circuitry within sensor housing 60 so as to activate the appropriate signal sensing and audible signalling apparatus of electronic level 10.

The Method

In practicing the method of this invention, the operator (not shown) places the sensor housing 60 of electronic level apparatus 10 in the desired position by matching indicia 64 with the preselected indicia 62. Switch 32 is moved to the right to activate the internal electronic circuitry within sensor housing 60. When sensing a predetermined angular position, the ferromagnetic fluid 42 is evenly disposed in torus 40 between sensing coils 50 and 51. The signals detected by sensing coils 50 and 51 pass into electronic sensing circuit 46 thereby triggering a signal to the circuitry of signal generator 48 which, in turn, transmits the appropriate signal to speaker 31. Correspondingly, when sensor housing 60 is rotated to a second position sensing coils 50 and 51 initiate the appropriate sensing signal to sensing circuitry 46 so as to provide an indication when the corresponding angular orientation has been achieved with electronic level 10. Ferromagnetic fluid 42 will always sense the true horizontal position so that movement of sensor housing 60 to a predetermined angular orientation correspondingly moves sensor coils 50 and 51 to a horizontal position when level body 12 is placed in the predetermined angular orientation. Verification of either the horizontal or the vertical orientation of electronic level 10 is accomplished by visually observing either horizontal level 20 or vertical level 24, respectively, when sensor housing 60 is positioned accordingly.

In one example of actual use, the operator (not shown) orientation of sensor housing 60, activates switch 32 and places electronic level 10 in a hollow duct, pipe, or the like, where neither horizontal level 20 or vertical level 24 is observable visually, either because of the constrictions of the pipe or duct or the lack of light therein. When the pipe or duct is correctly oriented to the desired angular position, the audible signal is emitted by speaker 31 indicating to the operator that the correct angular orientation of the particular pipe or duct (not shown) has been achieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Pat. is:

1. An electronic level comprising:
   a basal element having a flat surface;
   a hollow torus mounted coplanar in the basal element and partially filled with a ferromagnetic fluid;
   a pair of coils wrapped around said torus on opposite sides of said torus, said coils being positioned equidistantly on said torus;
   electronic sensing means for electronically sensing said ferromagnetic fluid in said torus with said pair of coils as a function of the position of said ferromagnetic fluid relative to said pair of coils;
   audible signal means for audibly signally when said ferromagnetic fluid is evenly disposed between said pair of coils; and
   a sensor housing rotatably mounted in said basal element, said hollow torus, said electronic sensing means, and said audible signal means being mounted in said sensor housing, said hollow torus being mounted in said sensor housing coaxial with the axis of rotation of said sensor housing.

2. The electronic level defined in claim 1 wherein said basal element includes a conventional level having a first, visible bubble in a first liquid to indicate when said flat surface is horizontal and a second, visible bubble in a second liquid to indicate when said flat surface is perpendicular to the horizontal, said hollow torus being rotatably mounted in said basal element and having a first indicia and a second indicia perpendicular to said first indicia, the first indicia indicating when the pair of coils is parallel to said flat surface, the second indicia indicating when said coils are perpendicular to said flat surface.

* * * * *